United States Patent [19]
Brooks

[11] Patent Number: 5,635,224
[45] Date of Patent: Jun. 3, 1997

[54] APPARATUS FOR RECYCLING PREVIOUSLY USED AGRICULTURAL PLASTIC FILM MUCH

[76] Inventor: Thomas W. Brooks, P.O. Box 999, Captiva, Fla. 33924

[21] Appl. No.: 451,451

[22] Filed: May 26, 1995

Related U.S. Application Data

[62] Division of Ser. No. 349,083, Dec. 2, 1994, Pat. No. 5,510,076.
[51] Int. Cl.$^6$ ................................................. B29B 17/02
[52] U.S. Cl. .................. 425/202; 425/456; 425/DIG. 46; 264/DIG. 69
[58] Field of Search ........................ 425/DIG. 45, 80.1, 425/82.1, 3, 202, 456, 461; 264/DIG. 69, 437

[56] References Cited

U.S. PATENT DOCUMENTS

| | | | |
|---|---|---|---|
| 3,752,631 | 8/1973 | Corbett et al. | 425/DIG. 46 |
| 4,162,880 | 7/1979 | Cobbs, Jr. et al. | 425/DIG. 46 |
| 5,160,354 | 11/1992 | Ascough | 264/DIG. 69 |
| 5,225,137 | 7/1993 | Sadr | 425/DIG. 46 |
| 5,407,624 | 4/1995 | Engh et al. | 264/DIG. 69 |
| 5,443,772 | 8/1995 | Inoue et al. | 425/DIG. 46 |
| 5,458,829 | 10/1995 | Ikeda et al. | 264/DIG. 69 |

*Primary Examiner*—Khanh P. Nguyen
*Attorney, Agent, or Firm*—Bell, Seltzer, Park & Gibson, P.A.

[57] ABSTRACT

An apparatus for recycling previously used agricultural plastic film mulch in which the plastic film mulch is fed by a conveyor along a predetermined path of travel, while being agitated and shaken on the conveyor to dislodge and remove dirt, debris and the like therefrom, shredding the plastic film mulch into discreet pieces in a shredder while removing additional dirt, debris and the like therefrom, conveying the shredded plastic film mulch through a vertical separator along a second, tortuous path of travel, while drying the shredded plastic mulch by heated air and agitating the plastic film mulch by projections extending into the second path of travel to dislodge and remove still further dirt, debris and the like therefrom, and extruding the cleaned and shredded plastic film mulch into a reusable form in an extruder, which melts the plastic film mulch, screens solids from the molten plastic, and extrudes the molten plastic into a reusable form, such as pellets.

5 Claims, 6 Drawing Sheets

Fig. 2C.

_fig.3._

_fig.4._

Fig. 8.

APPARATUS FOR RECYCLING PREVIOUSLY USED AGRICULTURAL PLASTIC FILM MUCH

This application is a divisional of application Ser. No. 08/349,083 filed Dec. 2, 1994 now U.S. Pat. No. 5,520,076.

FIELD OF THE INVENTION

This invention relates generally to the recycling of plastic films and more particularly to a method and apparatus for recycling plastic webs previously used as mulch in agricultural fields.

BACKGROUND OF THE INVENTION

It is very common in many agricultural fields and with many different agricultural crops, such as vegetables, to use plastic film webs as mulch covering the rows or seed beds. Plastic webs preserve moisture, inhibit weed growth and permit fumigation of the soil.

The rows or seed beds are prepared to have a planting surface above the level of the ground between the rows. The raised beds are covered by a web of plastic film and the opposite side edges of the plastic web are held down by a small amount of soil placed thereon. The crop is planted in the rows or seed beds by punching or cutting holes in the plastic webs at spaced intervals and setting plants or seedlings in the seed beds through such holes.

The plastic webs inhibit weed growth and conserve moisture. In addition, the crops may be irrigated by percolating water from below into the seed beds, with such percolation being assisted by plastic webs. A plastic web generally can be used for two successive crops and sometimes even more before it must be removed and replaced.

Upon removal of the used plastic webs from the agricultural field, disposal of such used plastic webs is a distinct problem. Heretofore, it has been common to dispose of such agricultural plastic mulch by depositing the same in landfills. Such landfills usually charge for the disposal of such agricultural plastic mulch by volume and weight and, accordingly, such disposal has been very expensive.

In more recent times, landfills are refusing to accept agricultural plastic mulch for disposal. Accordingly, users of such agricultural plastic mulch have few, if any, disposal options currently available to them. The used plastic film mulch simply accumulates in large mounds or stacks at the ends of the agricultural fields from which such agricultural mulch has been removed, or at other equally unacceptable locations.

In Applicant's co-pending application, Ser. No. 08/213,688, filed Mar. 16, 1994, there is disclosed an apparatus for removing and baling plastic mulch when it is desired to remove the same from the seed beds on which the plastic film mulch has been used. While such an apparatus effectively removes the plastic mulch and compacts and bales the same into compact form, the users of plastic mulch still are faced with the same disposal problems that existed with other forms of plastic mulch removal.

Disposal options, other than burying in landfills, for the agricultural mulch are further limited by the significant amounts of dirt, debris and the like which adhere to the used plastic film mulch after it is removed from the seed beds. Heretofore, the only effective means for removing the dirt, debris and the like from the used agricultural film mulch has been to wash the plastic mulch with water. The use of water on the plastic mulch is highly undesirable because of the volume of water required, the disposal of the contaminated water and the difficulty in drying the plastic mulch so that it may be further processed.

SUMMARY OF THE INVENTION

It is therefore an object of the present invention to provide a method and apparatus for recycling plastic film mulch from agricultural fields which solves the problems previously attendant to disposal of such agricultural film mulch.

It is a more specific object of the present invention to provide a method and apparatus for recycling previously used agricultural plastic film mulch in which dirt, debris and the like are removed from the previously used agricultural film mulch, the agricultural film mulch is shredded into relatively small pieces and the shredded plastic film mulch is extruded into a reusable form.

The foregoing objects of this invention are accomplished by a method and apparatus in which the previously used agricultural film mulch is formed into a relatively loose, linear mass by being either unrolled from the roll in which it was formed during removal or by breaking down the bales formed by the apparatus disclosed in Applicant's co-pending application. The loose mass of plastic film mulch is then transported or conveyed along a predetermined path of travel during which significant portions of the dirt, debris and the like adhering thereto are removed by agitating or shaking the plastic film mulch to dislodge the dirt and debris therefrom. In addition, an electromagnetic device attracts and removes any metal pieces that might be lodged in the loose mass of plastic film mulch. Thereafter, the plastic film mulch is shredded to reduce the form thereof into relatively small pieces or particles while removing additional amounts of dirt, debris and the like therefrom.

After being shredded, the plastic film pieces are fed through an additional cleaning and moisture removal step. More specifically, the shredded plastic mulch is fed through a tortuous path of travel within a cleaning device which also has heaters associated therewith to dry the plastic film pieces and remove any residual moisture therefrom. Because of the agitation of the plastic film pieces within the cleaning device, substantially all of the residual dirt, debris and the like are dislodged from the plastic pieces and fall downwardly by gravity into collection areas.

Following cleaning and drying, the plastic film pieces are fed into a holding area wherein the same are accumulated and then fed to one or more extruders which melt the plastic film pieces, screen any solid particles therefrom, and extrude the same into suitable containers in the form of pellets which are suitable for reuse to form other plastic products.

BRIEF DESCRIPTION OF THE DRAWINGS

Some of the objects and advantages of the present invention having been stated, others will appear as the description proceeds when considered in conjunction with the accompanying drawings, in which.

DETAILED DESCRIPTION OF THE ILLUSTRATED EMBODIMENT

Figure 1:
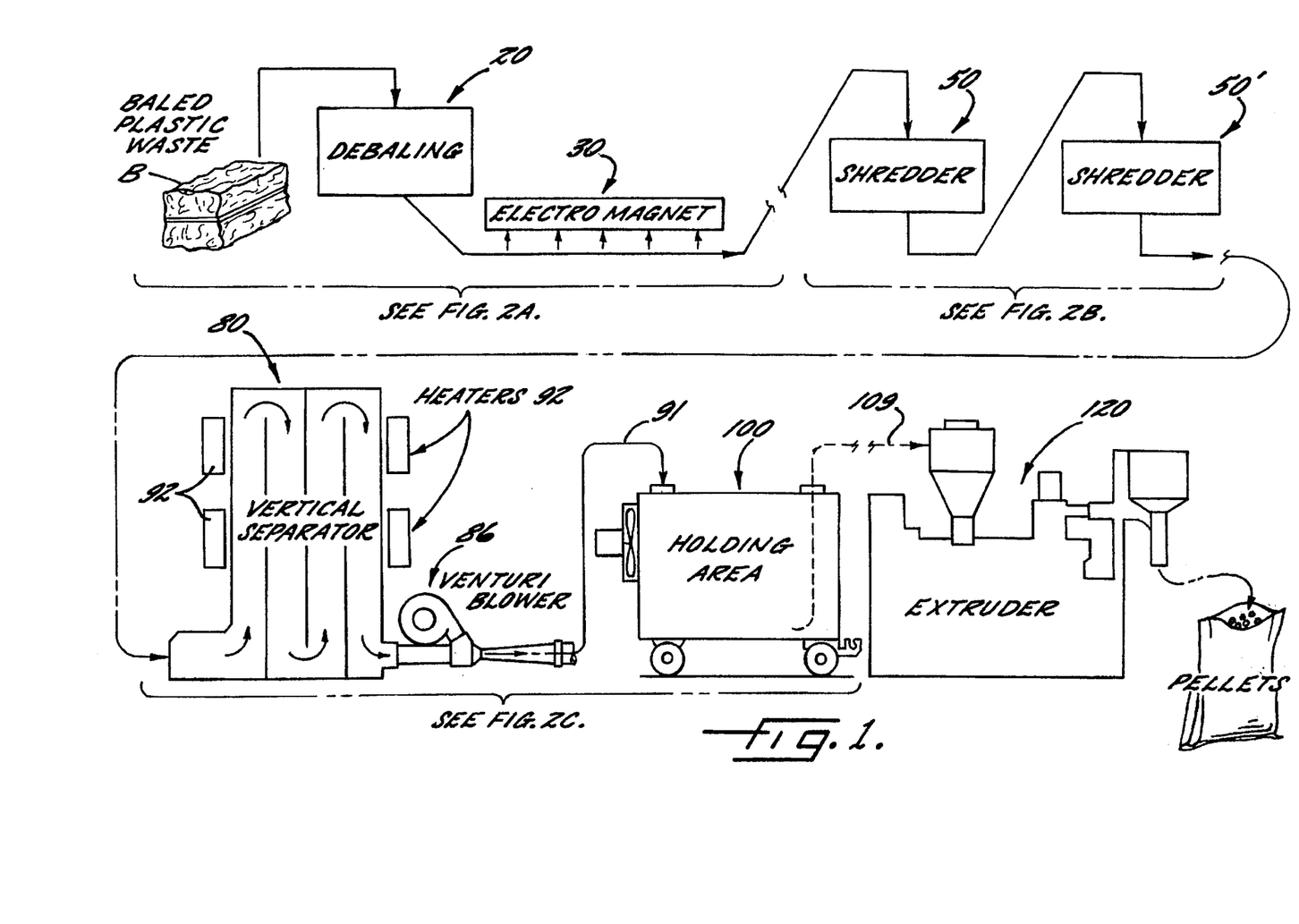
FIG. 1 is a schematic view illustrating the method and apparatus of the present invention.

Referring now more particularly to the drawings and specifically to FIG. 1, the preferred embodiment of the present invention will now be described. The used agricultural film mulch may be received and processed in any initial form, such as manually rolled into large rolls as has previously been the custom or in compacted bales as disclosed in Applicant's co-pending application. For illustration purposes, the used plastic film mulch is shown as being received in baled form.

In the initial stage of the method and apparatus of the present invention, the used plastic mulch is removed from its compacted form either by unrolling the rolls or by breaking down or de-baling the bales B into a relatively loose, linear form wherein the webs of plastic film are extended and not compacted to any appreciable extent. Such de-baling is generally referred to at 20 in FIG. 1. The next step in the method of the present invention is the removal of as much dirt, debris and the like from the loose mass of plastic mulch as possible and this step is generally referred to at 30.

Following the major cleaning step, the used plastic film mulch is shredded into pieces of predetermined size, which is generally referred to at 50. After shredding, there is a final cleaning step which is generally referred to at 80. The cleaned and shredded plastic film mulch is delivered to an accumulation or holding area generally referred to at 100. Finally, the cleaned and shredded plastic film mulch is delivered to an extruder-pelletizer generally referred to at 120.

Figures 2A, 2B:
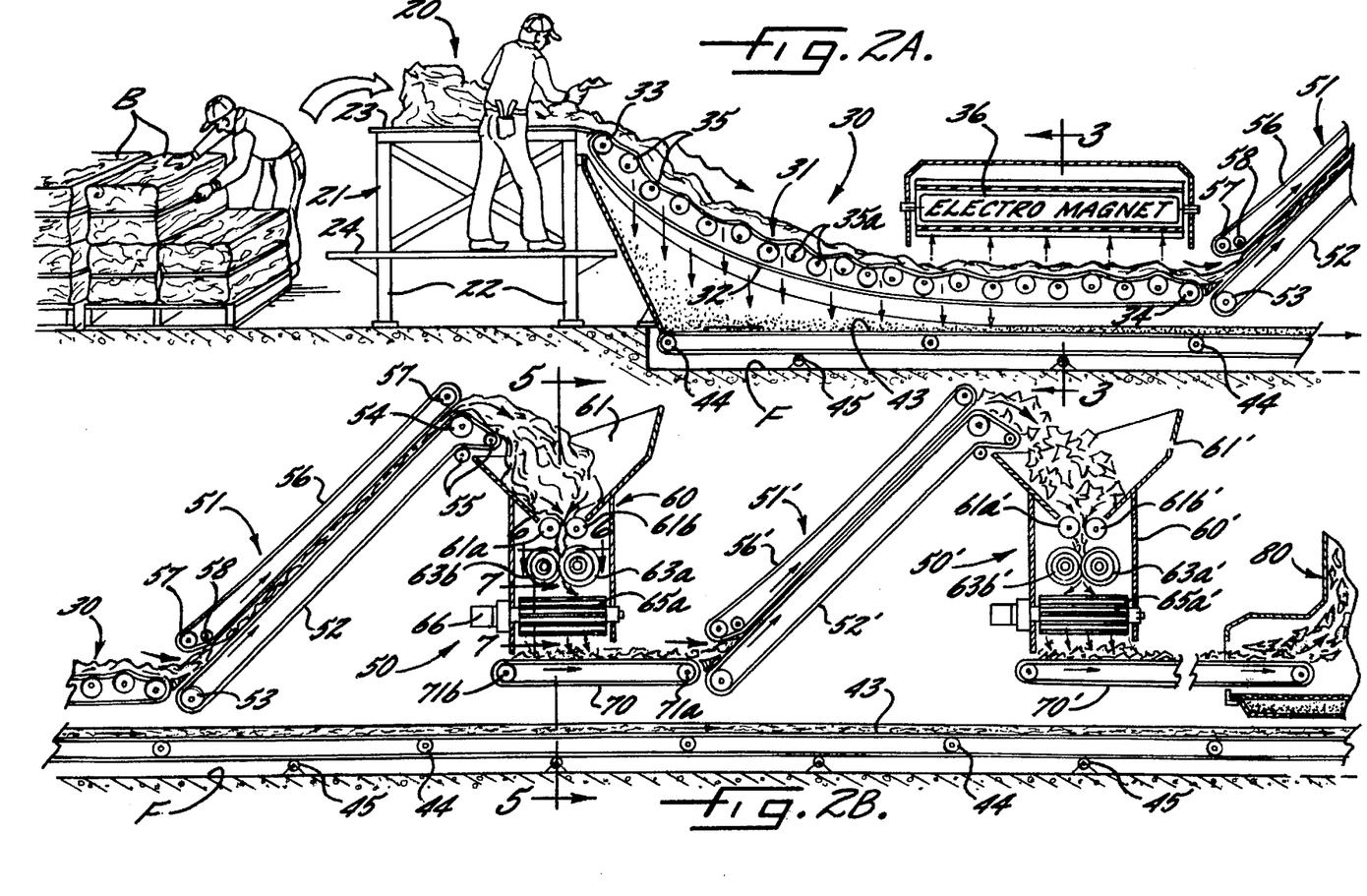
FIG. 2A is a fragmentary view, partially in section, of the method and apparatus illustrated in the upper left hand portion of FIG. 1.
FIG. 2B is a fragmentary schematic view, partially in section, of the shredder portion illustrated in FIG. 1.
Figure 2C:
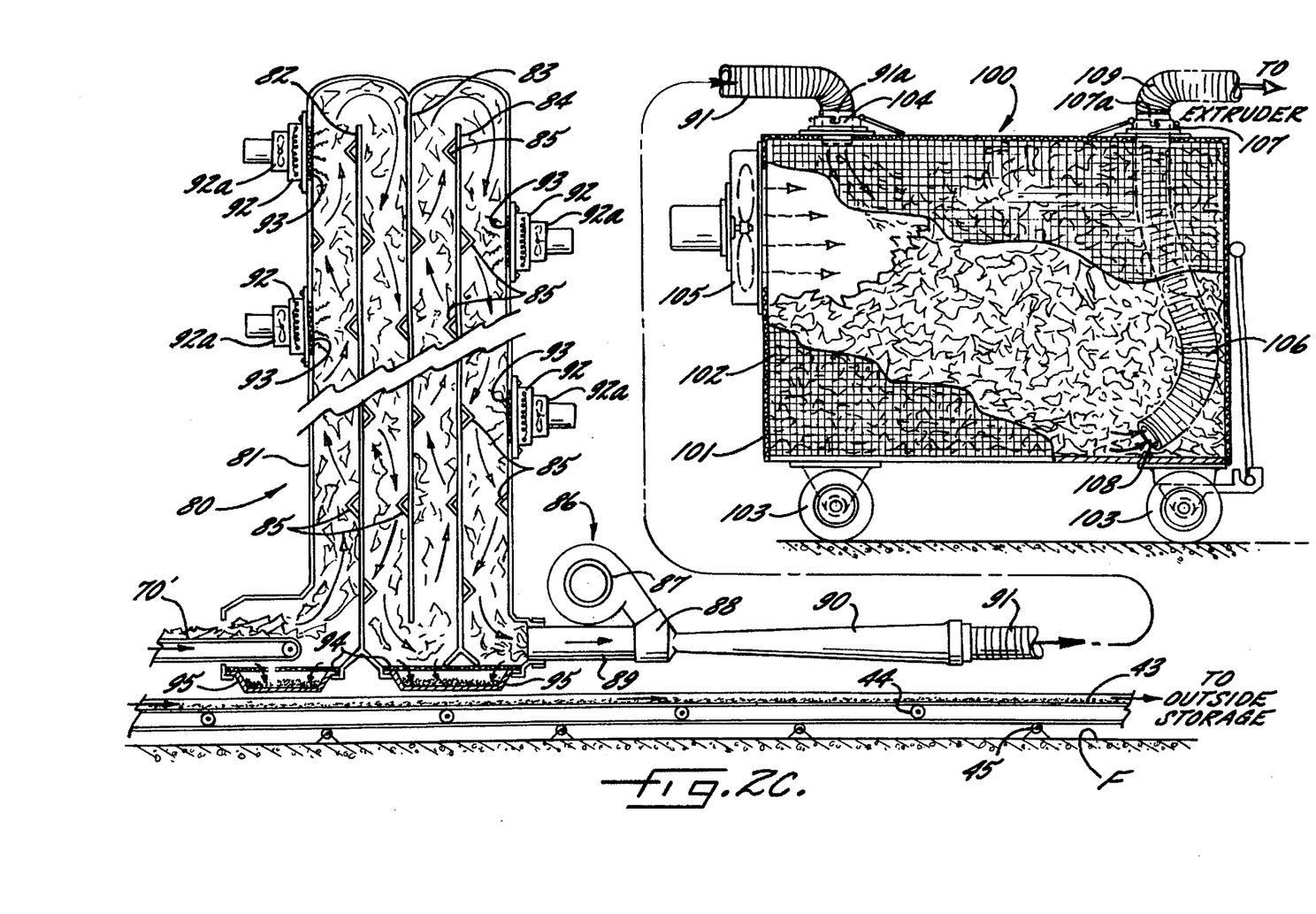
FIG. 2C is a fragmentary view, partially in section, of the vertical separator and holding portion illustrated in FIG. 1.

The apparatus of the present invention is more particularly shown in FIGS. 2A, 2B and 2C. Referring first to FIG. 2A, the receiving and de-baling area 20 includes a floor space which functions as the receiving area where palletized bales B of plastic mulch are received. The bales B are removed from the pallets manually and placed on a de-baling platform 21. The de-baling platform 21 includes a plurality of vertical posts 22 supporting a work platform 23 at the top thereof. A worker supporting platform 24 is mounted on the vertical posts 22 at a point intermediate the floor and the work platform 23 such that a worker can comfortably stand on the platform 24 and loosen or de-bale the plastic mulch.

Once the plastic mulch is de-baled or loosened into a generally loose mass, the cleaning step 30 can then commence. In this regard, during the de-baling process the operator can manually remove any large items of debris, such as stakes, stalks or other large items and deposit such debris in a waste bin (not shown). The loosened plastic webs are deposited on the upper run of a cleaning conveyor generally indicated at 31. The cleaning conveyor 31 includes an endless belt or similar conveying means 32 which is supported at opposite ends by drive rollers 33, 34. At least one of the drive rollers 33 and 34, and preferably both, are driven by a drive means (not shown). The belt 32 is foraminous, such that dirt, debris and the like dislodged from the plastic mulch can fall by gravity through the belt 32 downwardly. The belt 32 may consist of spaced interconnected slats or wire mesh or any other suitable material which will convey the plastic mulch while permitting the removed dirt, debris, and the like to pass therethrough.

Underneath the top run of the conveyor belt 32, there is disposed a plurality of rollers 35 which are mounted eccentrically on shafts 35a. Shafts 35a are interconnected by gears 35b and 35c (FIGS. 3 and 4) and are driven by a drive means (not shown). The eccentric rollers 35 are positioned closely together and are disposed along the full length of the upper run of conveyor belt 32. Due to the eccentric nature of the rollers 35, the upper run of the belt 32 is moved upwardly and downwardly in an undulating rapid manner to shake or agitate the plastic mulch in such a manner as to loosen or dislodge any dirt, debris or the like thereon and cause the same to fall downwardly through the foraminous belt 32.

To remove any magnetic-responsive materials, such as metals that are subject to magnetic attraction, an electromagnet 36 is disposed above the terminal end portion of the conveyor belt 32. Magnet 36 is positioned sufficiently close to the plastic mulch being conveyed to attract and remove metallic objects therefrom. Also, magnet 36 is of a width substantially the same as conveyor belt 35.

Figure 3:
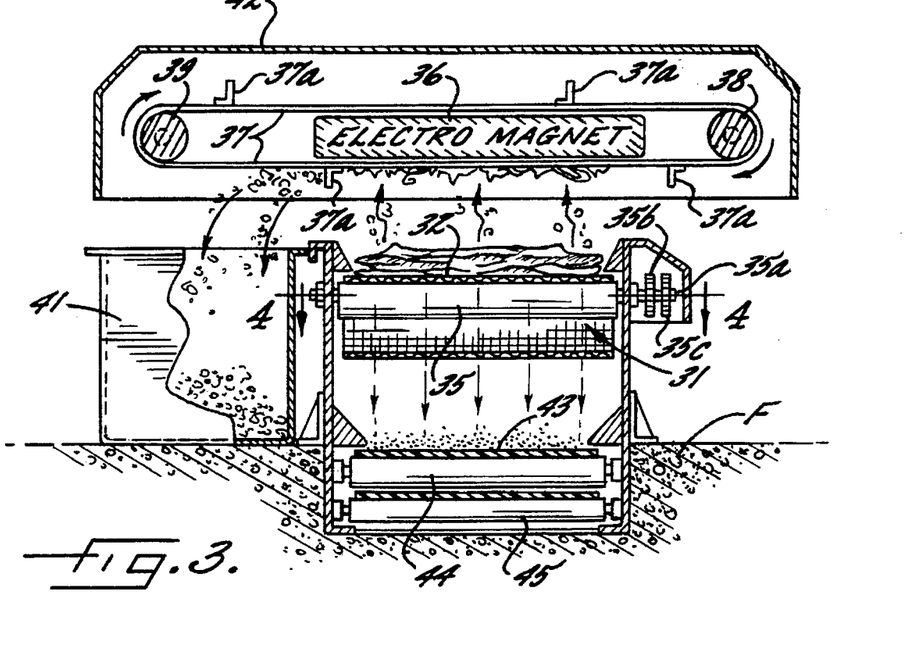
FIG. 3 is an enlarged transverse sectional view taken substantially along line 3—3 in FIG. 2A.
Figure 4:
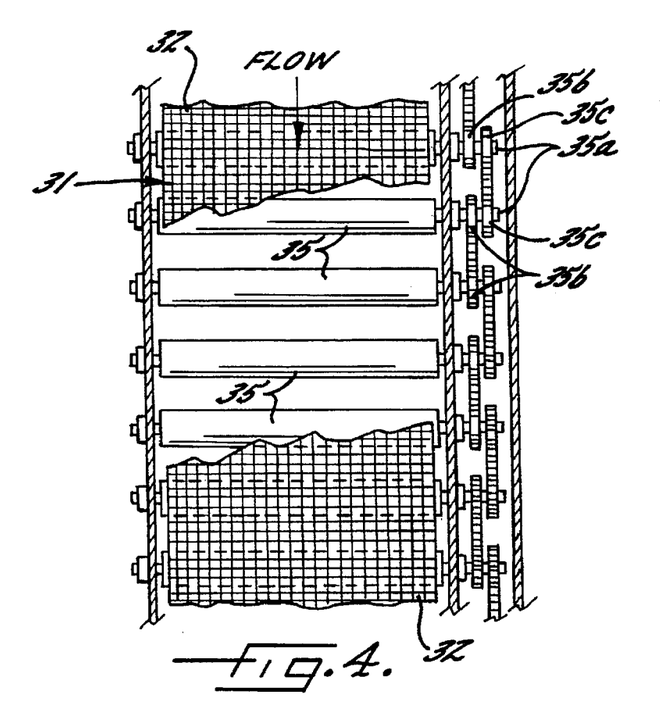
FIG. 4 is a fragmentary, enlarged sectional view taken substantially along line 4—4 in FIG. 3 with parts broken away for clarity.
Figures 5, 6, 7:
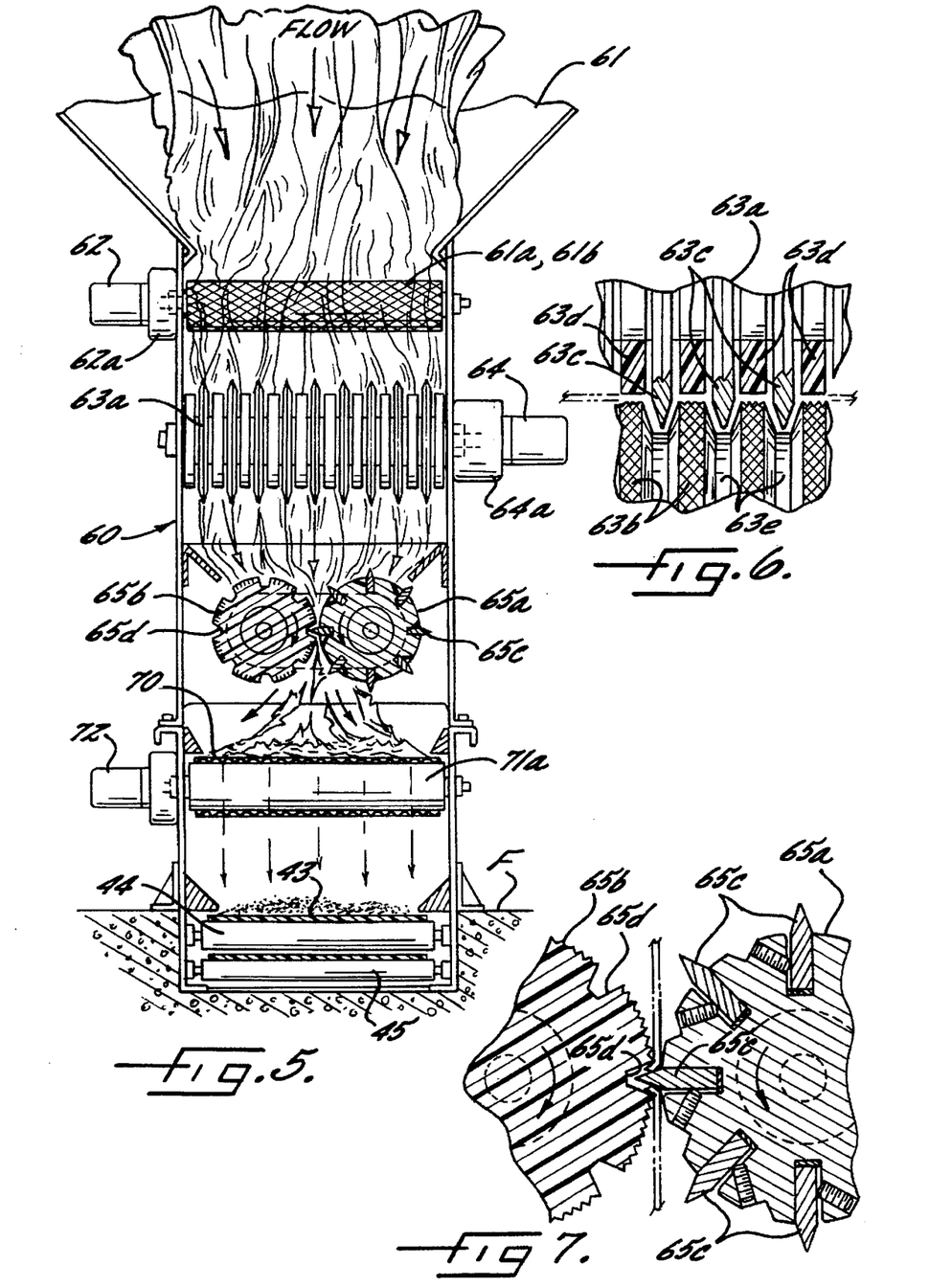
FIG. 5 is an enlarged sectional view taken substantially along line 5—5 in FIG. 2.
FIG. 6 is an enlarged, fragmentary sectional view taken substantially along line 6—6 in FIG. 2B.
FIG. 7 is an enlarged, fragmentary sectional view taken substantially along line 7—7 in FIG. 2B.

As shown in FIG. 3, the magnet 36 is disposed immediately adjacent the lower run of a waste conveyor belt 37 which is supported at opposite ends by rollers 38 and 39. At least one of the rollers 38 and 39 is driven by a drive means (not shown). Preferably, the conveyor belt 37 has spaced apart dividers 37a mounted thereon which extend across the full width of the conveyor belt 37. The conveyor belt 37 is of a length to extend beyond the width of electromagnet 36. Accordingly, any metallic objects attracted to the electromagnet 36 will be held on the lower surface of the bottom run of the conveyor belt 37 by the magnet 36 until the belt 37 clears the side of the magnet 36. Then, the metallic objects, which had been held on the lower surface of the conveyor belt 37, will fall by gravity from the belt 37 into a waste bin 41 disposed beneath the belt 37 and outwardly of the conveyor belt 35. To isolate the magnet from other areas of the plant, a non-magnetic cover 42 is mounted in covering relation to the magnet 36 and the conveyor belt 37. The cover 42 has an open bottom but a closed top, sides and ends.

Mounted beneath the conveyor belt 35 in a recessed area in the floor of the plant is a waste removal conveyor belt 43 which is supported by a plurality of rollers 44 at spaced points along the length thereof. The lower run of the conveyor belt 43 is supported by idler rollers 45 at spaced apart points along the length thereof. At least one of the rollers 44 is driven by a drive means (not shown). Any dirt, debris or other waste falling through the conveyor belt 35 will fall onto the waste removal conveyor belt 43 and be transported by the upper run thereof to the discharge end of the conveyor belt 43 on the outside of the plant where the same is deposited in a waste receptacle (not shown).

When the plastic mulch leaves the discharge end of conveyor belt 32, it is delivered to a conveyor means, generally referred to at 51, which forms a part of the shredding section 50. Conveyor means 51 includes a lower conveyor belt 52 supported at opposite ends by rollers 53, 54 and idler rollers 55 which are disposed at the upper end of the conveyor belt 52. Conveyor means 51 also includes an upper conveyor belt 56 which is disposed above the conveyor belt 52 and has the lower run thereof disposed closely adjacent to the upper run of belt 52 to positively grip the plastic film waste therebetween. The conveyor belt 56 is supported at opposite ends by rollers 57 and an idler roller 58. Conveyor belts 52 and 56 are driven by suitable drive means (not shown) such that the upper run of belt 52 and the lower run of belt 56 travel in the same direction. Preferably, the conveyor belts 52 and 56 are angled upwardly and terminate at their upper ends above the initial shredder means, generally indicated at 60.

Shredder means 60 includes a hopper 61 in which the plastic mulch is deposited by the conveyor means 51. The lower end of the hopper 61 is open and has a pair of feed rolls 61a and 61b disposed immediately adjacent thereto. The feed roll 61a is positively driven by a first synchronous motor 62, the output of which is connected directly to the shaft of the feed roll 61a. Feed roll 61a is connected to the feed roll 61b by a gear box 62a. The outer surfaces of the feed rolls 61a, 61b are preferably knurled to provide a positive grip on the plastic mulch being fed thereby. A first pair of shredding rolls 63a, 63b is mounted beneath the feed rolls 61a, 61b and has the axis thereof generally parallel to the feed rolls 61a, 61b. The shredding roll 63a is positively driven by a second synchronous motor 64 and roll 63a is connected to roll 63b by a gear box 64a such that the shredding rolls 63a, 63b are driven in synchronism with the feed rolls 61a, 61b.

The shredding roll 63a has a plurality of cutting disks 63c mounted in spaced apart relation and having outer sharpened peripheries which will cut through the plastic mulch as the shredding roll 63a rotates. The cutting disks 63c are maintained in the proper spaced apart relationship by spacers 63d. The shredding roll 63b is an anvil roll which is mounted closely adjacent to the cutting roll 63a and has an equal number of spaced apart grooves 63e in the outer periphery thereof for receipt of the cutting edges of the cutting disks 63c therein. The shredding rolls 63a and 63b cut the plastic mulch longitudinally into strips of a width equal to the spacing between the cutting disks 63c on cutting roll 63a.

Figure 8:
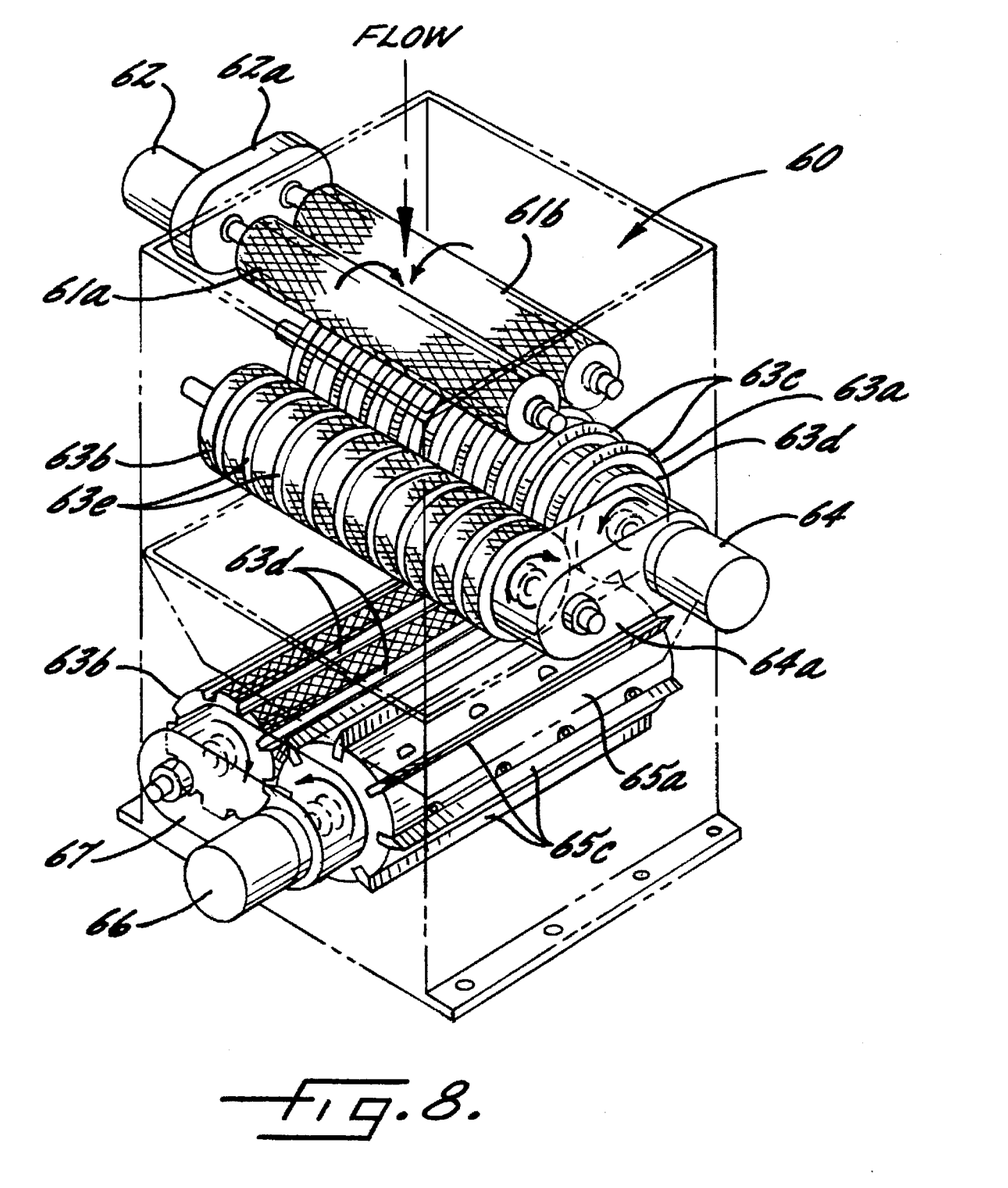
FIG. 8 is a fragmentary perspective view of the shredder shown in FIG. 2B and FIG. 5, with the enclosing cabinet shown in phantom lines.

A second pair of shredding rolls 65a, 65b are mounted below the first pair of shredding rolls 63a, 63b with the axes of the shredding rolls 65a, 65b perpendicular to the axes of the shredding rolls 63a, 63b. The shredding roll 65a includes a plurality of axially extending cutting blades 65c which are mounted in spaced apart relation around the circumference of the shredding roll 65a and extend the full length of the shredding roll 65a. The shredding roll 65b has an equal number of circumferentially spaced grooves 65d in the periphery thereof for receipt of the outer cutting edges of the blades 65c. The shredding roll 65a is driven by a third synchronous motor 66, the output of which is connected to the shaft of the shredding roll 65a. The shaft of the shredding roll 65a is connected to the shaft of the anvil roll 65b by a gear box 67. (FIG. 8).

In this manner, the plastic mulch is first cut into longitudinal strips by the shredding rolls 63a, 63b and then these strips are cut transversely by the shredding rolls 65a, 65b into pieces of a predetermined size. The cut or shredded pieces of the plastic mulch fall downwardly from the shredding rolls 65a, 65b onto the upper run of a conveyor belt 70 which is supported at opposite ends by rollers 71a, 71b. Roller 71a is driven by a synchronous motor 72. Preferably, the conveyor belt 70 is also foraminous such that any dirt, debris or the like that is dislodged from the plastic mulch during the initial shredding operation will fall downwardly through the conveyor belt 70 and onto the waste removal conveyor belt 43 which extends from the cleaning section 30 also underneath the shredding section 50.

One shredding apparatus 60 may be sufficient to reduce the size of the pieces of plastic waste material to that suitable for feeding to the extruding section 120. However, under most circumstances, it will be desirable to pass the initially shredded plastic through at least one additional shredding apparatus. In that event, the discharge end of the conveyor belt 70 feeds a second conveyor means 51' which includes a lower conveyor belt 52' and an upper conveyor belt 56'. The conveyor means 51' is identical to conveyor means 51 and will not be described again.

The discharge end of the conveyor means 51' feeds a second shredding apparatus 60' which has a hopper 61', feed rolls 62a', 62b', first shredding rolls 63a', 63b' and second shredding rolls 65a', 65b'. A second conveyor means 70' is disposed below the second shredding rolls 65a', 65b' for receipt of the shredded particles of plastic mulch which are shredded to a finer size than the particles being delivered from the first shredding means 60.

Insofar as particle size is concerned, two shredding apparatus will generally and usually be sufficient. However, for especially dirty plastic mulch, additional shredding apparatus may be desirable for additional cleaning purposes.

The conveyor belt 70' has the discharge end thereof disposed within the second cleaning section 80 which preferably is in the form of a vertical separator. The vertical separator 80 includes an outer housing 81 and a plurality of vertical dividers 82, 83 and 84 therein. The vertical divider 82 extends from the bottom of the housing 81 upwardly for a predetermined distance and terminates in a free upper end in spaced relation to the top of the housing 81. The vertical divider 83 extends downwardly from the top of the housing 81 and terminates in a bottom free end in spaced relation to the bottom of the housing 81. Finally, the divider 84 extends upwardly from the bottom of the housing 81 and terminates in a free end in spaced relation to the top of the housing 81. Accordingly, a serpentine or tortuous path of travel for the shredded plastic mulch is provided with the vertical separator 80. Preferably, the walls of the housing 81 and the dividers 82–84 have projections 85 extending outwardly therefrom and into the path of the shredded plastic mulch traveling through the vertical separator 80 to increase further the agitation of the shredded plastic mulch to enhance the cleaning effect.

A venturi suction means, generally referred at 86, is disposed on the discharge end of the vertical separator 80 and includes a blower 87 connected to a venturi 88. The inlet end 89 of venturi 88 is connected to the outlet of the vertical separator 80 and the discharge end 90 thereof is connected to a conduit 91. The venturi means 86 creates a suction in the vertical separator 80 which causes an airflow from the inlet end thereof upwardly through the first section of the vertical separator to entrain the shredded plastic mulch therein and cause the shredded plastic mulch to travel upwardly to the top of the initial section of the vertical separator 80. As the shredded plastic mulch travels upwardly, some of the particles will strike the projections 85 and will be deflected thereby causing the particles to be agitated or shaken within the moving airstream.

At the top of the housing 81, the airstream and entrained plastic waste will change direction and move downwardly to the bottom of the housing 81 while being agitated and shaken by the projections 85. When the airstream and entrained plastic waste reach the bottom of divider 83 they will again change direction and move upwardly between the dividers 83 and 84 to the top of the housing 81. Again, the airstream and entrained plastic mulch will change direction and move downwardly between the divider 84 and the outer wall of the housing 81 to the discharge end of the separator and the inlet end 89 of the venturi 86. To remove any residual moisture that may be collected on the plastic waste, a plurality of heaters 92 are mounted on the outer wall of the housing 81 and communicate with the interior of the housing 81 through screened openings 93 in the walls of the housing 81. The heaters 92 include motor driven fans 92a for forcing heated air through the screened openings 93 into the interior of the housing 81.

Any dirt, debris or other contaminants that are dislodged from the shredded plastic mulch within the housing 81 falls downwardly and passes through screened openings 94 in the bottom of the housing 81 and collect in removable waste pans 95 disposed below the screened openings 94. Periodically, the waste pans 95 may be removed and emptied.

Depending upon the cleanliness of the shredded plastic mulch exiting the vertical separator 80, further processing may or may not be desirable before feeding the plastic mulch to the recycling extruder 120. Additional separators 80 may be used as necessary to remove substantially all of the dirt, debris and the like from the shredded plastic mulch.

Four samples of used plastic mulch film were tested to determine the effectiveness of the cleaning process. The first sample was of uncleaned plastic mulch. The second sample was of shredded plastic mulch that had been passed through a single vertical separator 80. The third sample was of shredded plastic mulch that had been passed through the vertical separator 80 twice. The fourth sample was like samples two and three, except it was passed through the vertical separator 80 three times.

The samples were analyzed by ashing and by washing followed by weighing to evaluate the effectiveness of the cleaning thereof. The following table sets forth the results of this evaluation:

| Number of Cleanings | Weight before washing (g) | Weight after washing (g) | Moisture and Dirt content (%) |
|---|---|---|---|
| 0 | 37.11 | 23.70 | 36 |
| 1 | 7.24 | 6.07 | 16 |
| 2 | 8.10 | 7.97 | 1.6 |
| 3 | 20.87 | 20.59 | 1.3 |

An additional, perhaps less scientific, evaluation was performed by starting with 80 pounds of used plastic mulch which was passed through the shredding apparatus 60 three times. The resultant shredded plastic mulch was then passed through the vertical separator 80 five times and was weighed after each pass. After the first pass, the shredded plastic mulch weighed 35 pounds. After the second pass, the shredded plastic mulch weighed 31 pounds; after the third, 28½ pounds; after the fourth pass, 27½ pounds; and after the fifth pass, 27 pounds. Accordingly, from the 80 pounds of used plastic mulch, 53 pounds of dirt, debris and moisture were removed.

The cleaned shredded plastic mulch is delivered by the conduit 91 to the accumulating or holding area 100 which preferably comprises a mobile truck 101. Truck 101 includes a foraminous body 102 in the form of screen wire or the like forming the side end and top walls. Preferably, the truck 101 includes wheels 103 such that the same may be removed when full of plastic mulch and an empty truck put in its place. To that end, the conduit 91 has an easily removable connector 91a which mates with a connector 104 on the top wall of the body 102 of the truck 101. A motor driven fan 105 is disposed in one of the end walls of the body 102 of the truck 101 adjacent the inlet 104 to blow the shredded plastic mulch to the far end of the body 102 to ensure that the body 102 is completely filled with plastic mulch before the inlet 104 becomes clogged.

The accumulator or holding truck 101 includes a discharge conduit 106 which extends from an outlet 107 at the top downwardly to an inlet end 108 at the bottom thereof. The outlet 107 has a releasable connector 107a to which a supply conduit 109 can be easily connected and disconnected. The supply conduit 109 supplies the shredded plastic mulch to the extruder 120.

The extruder 120 may be of any desired type for recycling plastic materials, there being several different types available commercially. One such extruder is manufactured by "Munchy" Ltd. Aston Hill, Lewknor, Oxfordshire 0X95SG England and is sold in this country by Action Industries, Inc., P.O. Box 322, Ellington, Conn. 06029. The preferred type of the Munchy recycling extruders to be used in this process and with this apparatus is the XL 120, vented extruder. The particular type of extruder to be selected will depend upon the throughput desired. For example, the XL 120 can be operated to have a capacity of 700 lbs. per hour of plastic recycled therethrough. The extruder 120 melts the plastic film, screens solids therefrom, and extrudes the molten plastic in a reusable form, such as pellets.

In the drawings and specifications, there has been set forth a preferred embodiment of the invention, and although specific terms are employed, they are used in a generic and descriptive sense only and not for purposes of limitation.

That which is claimed is:

1. Apparatus for recycling previously used plastic film comprising:

shredder means for shredding the plastic film into discreet pieces and for removing dirt, debris and other contaminants from the plastic film;

conveying means for conveying the shredded plastic film by a moving air stream along a tortuous path of travel, said conveying means including vertical separator means for agitating the shredded plastic film along a portion of said predetermined path of travel to dislodge and remove an additional amount of dirt, debris and other contaminants from the shredded plastic film; and extruder means for receiving the cleaned and shredded plastic film and for extruding the same into a reusable form.

2. Apparatus according to claim 1 further including projection means disposed in the vertical separator and extending into the path of travel of the shredded plastic film for further agitating and shaking the shredded plastic film to dislodge and remove dirt, debris and other contaminants therefrom.

3. Apparatus for recycling previously used plastic film comprising:

first conveyor means for conveying the plastic film along a predetermined path of travel in a relatively loose form and in the absence of any added water or moisture, agitating means operatively associated with said conveyor means for shaking or agitating the plastic film on said conveyor means to dislodge dirt, debris and other contaminants from the plastic film, shredder means for receiving the plastic film from said conveyor means and for shredding the plastic film into discrete pieces of predetermined size while removing an additional amount of dirt, debris and other contaminants therefrom, second conveyor means for receiving the shredded plastic film from said shredder means and for conveying said shredded plastic film along a tortuous path of travel by a moving air stream while further agitating the shredded plastic film to remove additional dirt, debris and other contaminants therefrom, and extruder means for receiving the shredded and cleaned plastic film from said second conveyor means and for extruding the plastic film in a reusable form.

4. Apparatus according to claim 3 including heating means for heating the air stream to remove any residual moisture from the shredded plastic film.

5. Apparatus according to claim 3 wherein said shredder means comprises first and second shredders arranged in tandem, said first shredder being connected to said first conveyor means and said second shredder being connected to said first shredder.

* * * * *

UNITED STATES PATENT AND TRADEMARK OFFICE
CERTIFICATE OF CORRECTION

PATENT NO. : 5,635,224            Page 1 of 2
DATED : June 3, 1997
INVENTOR(S) : Thomas W. Brooks It is certified that error appears in the above-identified patent and that said Letters Patent is hereby corrected as shown below:

On the title page: Item [54]

Column 1, in the title, "MUCH" should be -- MULCH --;

On the title page, Column 2, in the Abstract at line 6, "discreet" should be -- discrete --;

Column 1, line 3 of the title, "MUCH" should be -- MULCH --;

Column 1, line 52, after "1994," insert -- now U.S. Patent No. 5,452,652, --;

Column 5, line 56, after "67" delete the period;

Column 6, line 48, after "referred" insert -- to --;

Column 7, line 36, "ashing" should be -- washing --;

Column 7, line 57, after "third" insert -- pass --;

UNITED STATES PATENT AND TRADEMARK OFFICE
CERTIFICATE OF CORRECTION

PATENT NO. : 5,635,224
DATED : June 3, 1997
INVENTOR(S) : Thomas W. Brooks

It is certified that error appears in the above-indentified patent and that said Letters Patent is hereby corrected as shown below:

Column 7, line 66, after "side" insert -- , --;

Column 8, line 32, "specifications" should be -- specification --;

Column 8, line 39, "discreet" should be -- discrete --

Signed and Sealed this

Eleventh Day of November, 1997

Attest:

BRUCE LEHMAN

*Attesting Officer*      *Commissioner of Patents and Trademarks*